Figure 1:
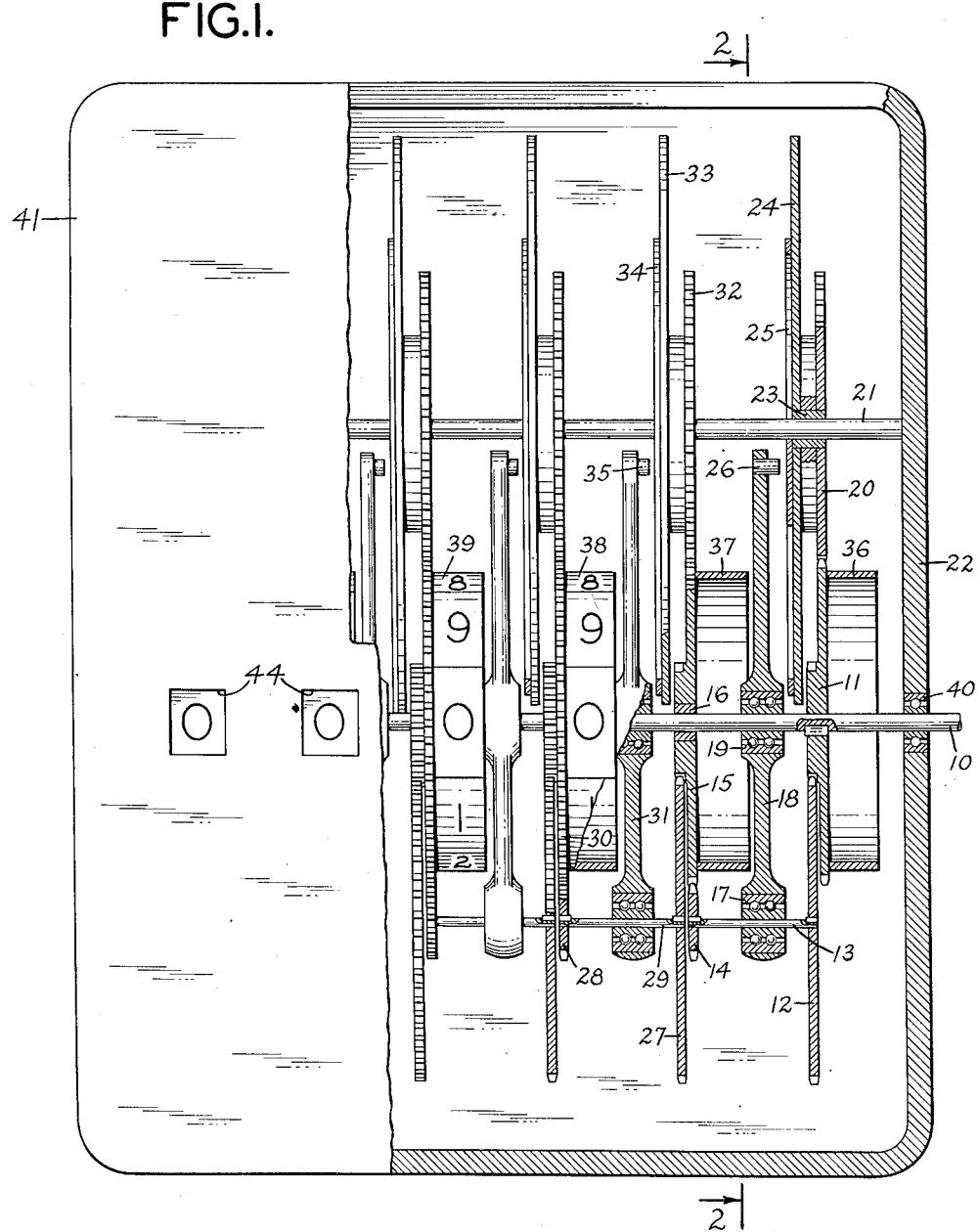

Feb. 19, 1952 F. W. CUNNINGHAM 2,586,520
NUMERAL WHEEL ALIGNING MECHANISM
Filed Jan. 13, 1949 2 SHEETS—SHEET 1

INVENTOR:
FREDERICK W. CUNNINGHAM
BY
HIS ATTORNEYS.

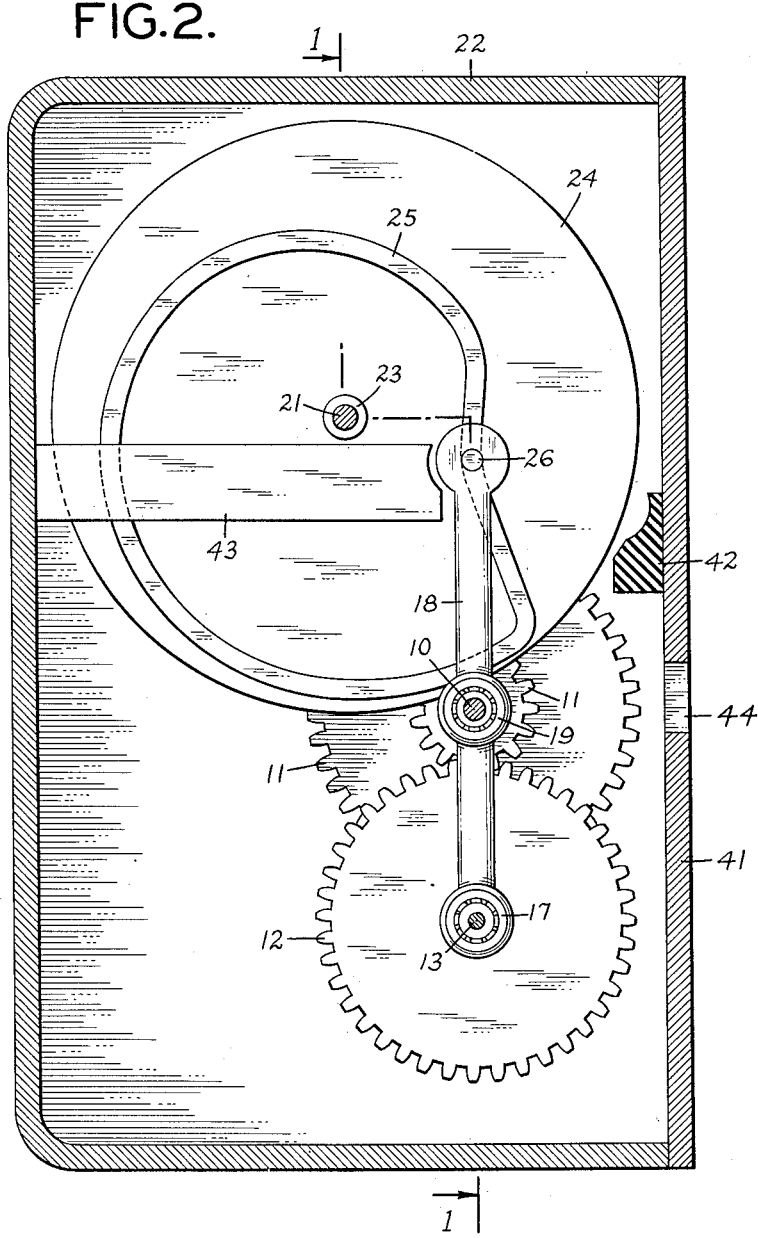

Patented Feb. 19, 1952

2,586,520

UNITED STATES PATENT OFFICE 2,586,520

NUMERAL WHEEL ALIGNING MECHANISM

Frederick W. Cunningham, Stamford, Conn., assignor to Arma Corporation, Brooklyn, N. Y., a corporation of New York Application January 13, 1949, Serial No. 70,643

5 Claims. (Cl. 235—91)

This invention relates to counters, and has particular reference to revolution counters adapted to be operated at high shaft speeds as, for example, when used in optical range finders and the like.

It is well known that rapid slewing of a range finder while training on a new object or target may cause extremely high speed rotation of the counter shaft, the angular displacement of which is a measure of the range, so that the total number of revolutions made by the shaft of the counter from the reference point must be accurately determined immediately upon cessation of the slewing operation. This requirement necessitates a counter which is operable at extremely high speeds without injury and still presents an accurate and easily read indication when the counter shaft speed is reduced to normal.

The revolution counters which are in common usage are constructed to have either continuously rotating gearing or intermittently rotating components as typified respectivelly by the "gas meter" and "odometer" counters. In the counter having continuously rotating gearing, the number of revolutions made by the shaft is determined by observing the position of a pointer on each of several dials, one dial for each significant figure. The pointers are continuously driven about the dials, thus making accurate reading difficult, particularly when the pointer is near one of the reference marks on its dial. With respect to prior counters of the type having intermittently rotating components, they can be read easily and accurately, but are unsuitable for high speed applications where the counter units are exposed to severe strain, as when the components at rest are suddenly set into motion by the rotating components and are just as suddenly brought to rest again, i. e., the conditions of operation of range finders and the like. The impact forces thus set up may permanently damage the counter unit, eventually causing failure or undue wear of the counter components.

In accordance with the present invention, a high speed counter, adaptable to the severe service requirements mentioned, is provided, in which an intermediate gear train is interposed between the driving gear of the lower order unit and the driven gear of the higher order unit of each counter. These gear trains are mounted on a shaft rotatable about the main shaft and the shaft carrying the intermediate gear train is oscillated about the main shaft in a manner such that the driven gear of the higher order unit remains stationary for nine-tenths of a revolution of the driving gear, and the driven gear is then rotated through one-tenth of a revolution as the driving gear completes its revolution, thereby producing a step-by-step rotation of the driven gear. This oscillatory motion of the intermediate gear train is achieved by the action of a cam and follower combination which are automatically disengaged at excessively high speeds in order to discontinue the intermittently rotating gearing in favor of continuously rotating gearing, thereby protecting the counter from damage.

It will be seen that the counter of this invention may be operated at very high speeds and started and stopped suddenly without impairing its accuracy of causing damage, thus enabling the device to be made light in weight and sufficiently precise in construction to render it accurate for use in optical range finders and the like.

For a more complete understanding of the invention, reference may be had to the accompanying drawings, in which:

Figure 1 illustrates the general construction of the high speed counter of this invention, with the cover broken away to reveal the interior mechanism, a portion of which is shown in section as seen along the line 1—1 of Fig. 2, and Fig. 2 illustrates the construction of the oscillating mechanism of the first order unit, as seen along the line 2—2 of Fig. 1.

Referring to the drawings, the counter mechanism is contained within case 22 and the indicia on numeral wheels 36, 37, 38 and 39 which are equally spaced about the periphery and comprise the numerals from 0 to 9, inclusive, are viewed through apertures 44 in cover plate 41. The number of revolutions to be determined are those made by main shaft 10, which projects through case 22 and is journaled in bearing 40 and a similar bearing on the opposite end. Gear 11 keyed to shaft 10 and carrying numeral wheel 36 drives the first order unit comprising gears 12, 14, 15 and 20, cam plate 24, cam track 25 and cam follower 26, rocker arm 18, number wheel 37 and shaft 13.

Main shaft gear 11 is connected to gear 15 by gears 12 and 14 keyed on stub shaft 13, so as to drive gear 15 and its attached numeral wheel 37 about main shaft 10 on which gear 15 is journaled by bearing 16. Stub shaft 13 is in turn journaled in anti-friction bearing 17 carried by rocker arm 18 supported by main shaft 10 over anti-friction bearing 19 so that rocker arm 18 has freedom of rotation about main shaft 10. As shown in Fig. 2, rocker arm 18 is a straight bar arranged generally parallel to the cover plate 41 of casing 22. Gear 11 also drives gear 20 about shaft 21, which is secured to case 22 and about which bearing 23 supplies a smooth bearing surface, at a speed equal to the speed of gear 11. Non-magnetic cam plate 24, integral with gear 20, has affixed to its surface the soft iron cam track 25 in the form of a raised ridge, which attracts the permanent magnet cam follower 26 set into rocker arm 18, in the manner to be described.

The gear ratio between gears 11, 15 is such that when gear 11 is rotated and rocker arm 18 is held stationary, gear 15 is rotated one-tenth as far as gear 11. However, if rocker arm 18 is simultaneously rotated about shaft 10, the rotation of gear 15 is increased or decreased proportionally, depending on the direction of rotation of rocker arm 18, and, by suitable rotation of said rocker arm, gear 15 can be made to remain stationary as gear 11 rotates, or to rotate at the same rate of speed as gear 11.

The second order unit, comprising gears 27, 28, 30, 32, shaft 29, rocker arm 31, cam plate 33, cam track 34, permanent magnet cam follower 35 and numeral wheel 38 is similar in all respects to the first order unit just described. Identical order units subsequent to order two likewise are installed on shafts 10 and 21 to drive numeral wheel 39 and as many additional numeral wheels as desired. Tenths of revolutions on shaft 10 are indicated on numeral wheel 36, unit revolutions on numeral wheel 37, tens of revolutions on numeral wheel 38, and so on to numeral wheel 39 and beyond. Standard order units may be installed to drive the higher order units in which the speed of the components is reduced by gearing in a known manner so that speed does not approach the limit of safety at high shaft speeds.

The automatically disengaging magnetic cam follower 26 and cam track 25 prevent undue stress on the elements of the order units at extreme speeds of shaft 10 whereas the use of conventional cams and followers would set up tremendous forces in the cam elements, rocker arms and gears.

At excessively high speeds of shaft 10 the magnetic attraction between cam track 25 and permanent magnet cam follower 26 is not sufficiently strong to oscillate rocker arm 18 about shaft 10, but the momentum of rocker arm 18 attained during the first nine-tenths of a revolution of shaft 10 causes rocker arm 18 to continue swinging clockwise and come in contact with resilient stop 42. Continued extremely high rotational speed of shaft 10 causes rocker arm 18 to remain in contact with stop 42 due to the combined contributions of cam track 25 and follower 26 and the frictional drag of gear 15 so that numeral wheel 37 is rotated continuously and therefore the possibility of damage to the counter unit is eliminated by having continuously rotating gearing at these extreme speeds.

In operation of the high speed counter of this invention, main shaft 10 driven by the outside source whose revolutions are to be counted, drives first counter gear 11 fixed thereto. As gear 11 rotates through the first nine-tenths of a revolution, in a direction counter-clockwise from the position as seen in Fig. 2, cam plate 24 is rotated nine-tenths of a revolution in a clockwise direction and, through the magnetic action of cam follower 26 following cam track 25, rocker arm 18 is rotated 36° uniformly clockwise about shaft 10. This magnetic coupling is effected at relatively low speeds, and the air gap between permanent magnet 26 and cam track 25 is narrowest, which is when magnet 26 lies directly over track 25, thus causing the latter to magnetically drag magnet 26 with it in oscillation.

The total rotation of gear 15, due to the combined action of gear 11 and rocker arm 18, is composed of three rotations which total zero. The three rotations are (1) 32.4° in a counter-clockwise direction due to rotation of gear 11 through 324°, (2) 3.6° in a counter-clockwise direction due to the rotation of gears 12 and 14 about the axis through shaft 13 as a result of the motion of rocker arm 18, and (3) 36° in a clockwise direction due to the revolution of shaft 13 about shaft 10 by rocker arm 18, thereby making the sum total zero, since the sum of the angles of negative sign is equal to the angle of positive sign. Accordingly, during the first nine-tenths revolution of gear 11, gear 15 and second order numeral wheel 37 remain stationary, so that only one readily-read stationary numeral remains on view through aperture 44.

As the final one-tenth revolution of gear 11 is completed, rocker arm 18 following cam 25 is rotated through 36° in a counter-clockwise direction back to its original starting position. Gear 15 is therefore rotated through 3.6° in a counter-clockwise direction by the rotation of gear 11, through 3.6° in a clockwise direction by gears 12 and 14 rotating about their common axis, due to the motion of rocker arm 18, and through 36° in a counter-clockwise direction by the rotation of shaft 13 about shaft 10, or a total of 36° in a counter-clockwise direction, so that second order numeral wheel 37 is turned through one-tenth revolution and therefore displays the succeeding numeral through aperture 44.

As gear 15 rotates through one-tenth of a revolution, rocker arm 31 is rotated by the magnetic coupling between magnet 35 and track 34, this rotation being through an angle of 4° and the combined actions of gear 15 and rocker arm 31 cause gear 30 and third order numeral wheel 38 to remain stationary. This same behavior is repeated for the first nine-tenths of a revolution of gear 15. During the final tenth of the revolution of gear 15, however, the combined action of rocker arm 31 and gear 15 causes gear 30 to be rotated through one-tenth revolution. Since the motion of gear 15 takes place during one-tenth revolution of gear 11, the motion of gear 30 also takes place during one-tenth revolution of gear 11, thereby creating a decided "step-by-step" motion.

The speed of shaft 10 may become high enough to cause cam follower 35 and the cam followers of higher order units to be disengaged from their respective cams and thereby effect continuous rotation of the gearing and their associated numeral wheels in these order units. During these extremely high speeds the readings of the numeral wheels cannot be accurately obtained, but when normal speeds are resumed, and the permanent magnet cam followers 26, 35 are again attracted to their respective cams 25, 34, causing oscillation of the corresponding rocker arms 18, 31 and producing step-by-step motion of the numeral wheels, the counter indicia jointly indicate correctly the number of revolutions made by shaft 10.

The shaft of the counter may be rotated in the reverse direction, i. e., clockwise as seen in Fig. 2, producing decreasing indications on the numeral wheels which is a normal action in the operation of revolution counters. Excessively high speed causes rocker arm 18 of the first order unit to be driven against resilient stop 43 and perhaps the rocker arms of higher order units against similar stops producing continuous rotation of the gearing and numeral wheels, thereby preventing damage to the counter by eliminating any possible source of impact in the rapidly operating order units.

Although in the particular embodiment described, a magnetic cam track and follower is employed, it is not intended that the disengaging cam and follower be limited to one which depends on magnetic attraction for its operation, but any means of release at high speeds such as centrifugal or other types may be employed. Also, although a preferred embodiment of the invention has been illustrated and described herein, the invention is not limited thereto except as defined by the appended claims.

I claim:

1. In a mechanical counting mechanism having at least first and second digital order numeral devices movable relatively to an index, and a driver therefor, the combination of a movable member, tens transfer driving connections between said first and second devices operable in the absence of movement of said member, said member being connected to said first and second devices through means including at least a portion of said tens transfer driving connections for movement in one direction with said first device to drive said second device in a given direction and variable motion means including a magnetically connected cam and follower combination interposed between said first device and said member for oscillating the latter first in a direction opposite to said one direction to cancel the movement imparted by said first device to said second device by said tens transfer driving connection and then in said one direction to advance the second device a predetermined degree.

2. In a mechanical counting mechanism having at least first and second digital order numeral devices movable relatively to an index, and a driver therefor, the combination of a movable member, tens transfer driving connections between said first and second devices operable in the absence of movement of said member, said member being connected to said first and second devices through means including at least a portion of said tens transfer driving connections for movement in one direction with said first device to drive said second device in a given direction, a cam driven by said first device and having a cam track of magnetic material, and a magnet carried by said member and spaced from said cam track by a narrow air gap, said cam track being a closed non-circular ring for moving said member first in a direction opposite to the movement of said first device to cancel the movement of said second device by said first device through said tens transfer driving connections and then in said one direction to advance the second device a predetermined degree.

3. In a mechanical counting mechanism having at least first and second digital order numeral devices movable relatively to an index, and a driver therefor, the combination of a movable member, tens transfer driving connections between said first and second devices operable in the absence of movement of said member, said member being connected to said first and second devices through means including at least a portion of said tens transfer driving connections for movement in one direction with said first device to drive said second device in a given direction, a pivot for said member, a cam driven by said first device and having a closed non-circular track of magnetic material, and a permanent magnet follower carried by said member cooperating with said cam track across a narrow air gap for moving said member about its pivot first in a direction opposite to said one direction to cancel the movement imparted to said second device by said first device through said tens transfer driving connections and then in said one direction to advance said second device a predetermined degree.

4. In a mechanical counting mechanism having at least first and second digital order numeral devices movable relatively to an index, and a driver therefor, the combination of a first gear driven by said driver, a second gear driving said second device in one direction and connected coaxially with said first gear to be driven thereby to provide a driving connection between said devices whereby rotation of said first device causes said second gear to impart rotational movement to said second device, a member carrying said coaxial gears about a fixed pivot, a cam driven with said first gear and having a non-circular closed cam track of magnetic material and a magnetic follower on said member for following said cam track to oscillate said member about its pivot first in a direction opposite to said one direction to move said second gear bodily about said pivot to cancel the rotation imparted thereby to said second device and then in said one direction to advance said second device a predetermined degree.

5. In a mechanical counting mechanism having at least first and second digital order numeral devices movable relatively to an index, and a driver therefor, the combination of driving connections between said first and second devices whereby movement of the first imparts movement to the second, an oscillatory member, means connecting said member to be oscillated by said first device, means including at least a portion of said driving connections connecting said oscillatory member to said second device to modify the movement of the latter positively for one direction of movement of the member and negatively for the other direction of movement of the oscillatory member, said means connecting the said member to be oscillated by the first device including a cam track of magnetic material connected to be actuated by said first device, a cam follower of magnetic material for driving said member, one of said cam elements being magnetized to form a magnetic connection between the follower and track which is separable in response to overloading to disable the follower from following the cam, and stop means for receiving said member in either direction of movement when the follower is disabled.

FREDERICK W. CUNNINGHAM.

REFERENCES CITED

The following references are of record in the file of this patent:

UNITED STATES PATENTS

| Number | Name | Date |
|---|---|---|
| Re. 13,184 | Rickman | Dec. 20, 1910 |
| 1,246,087 | Gooch | Nov. 13, 1917 |
| 1,277,371 | Boyle et al. | Sept. 3, 1918 |
| 1,913,983 | Gardner | June 13, 1933 |
| 2,156,539 | McMurdo | May 2, 1939 |
| 2,265,628 | Chase | Dec. 9, 1941 |
| 2,416,081 | Bakke | Feb. 18, 1947 |
| 2,420,607 | Mendelsohn | May 13, 1947 |
| 2,456,101 | Yeasting | Dec. 14, 1948 |
| 2,490,725 | Yeasting | Dec. 6, 1949 |